Feb. 24, 1948.  E. F. MANGOLD  2,436,585
PORTABLE MILK-PASTEURIZING APPARATUS
Filed Sept. 1, 1943  2 Sheets-Sheet 1
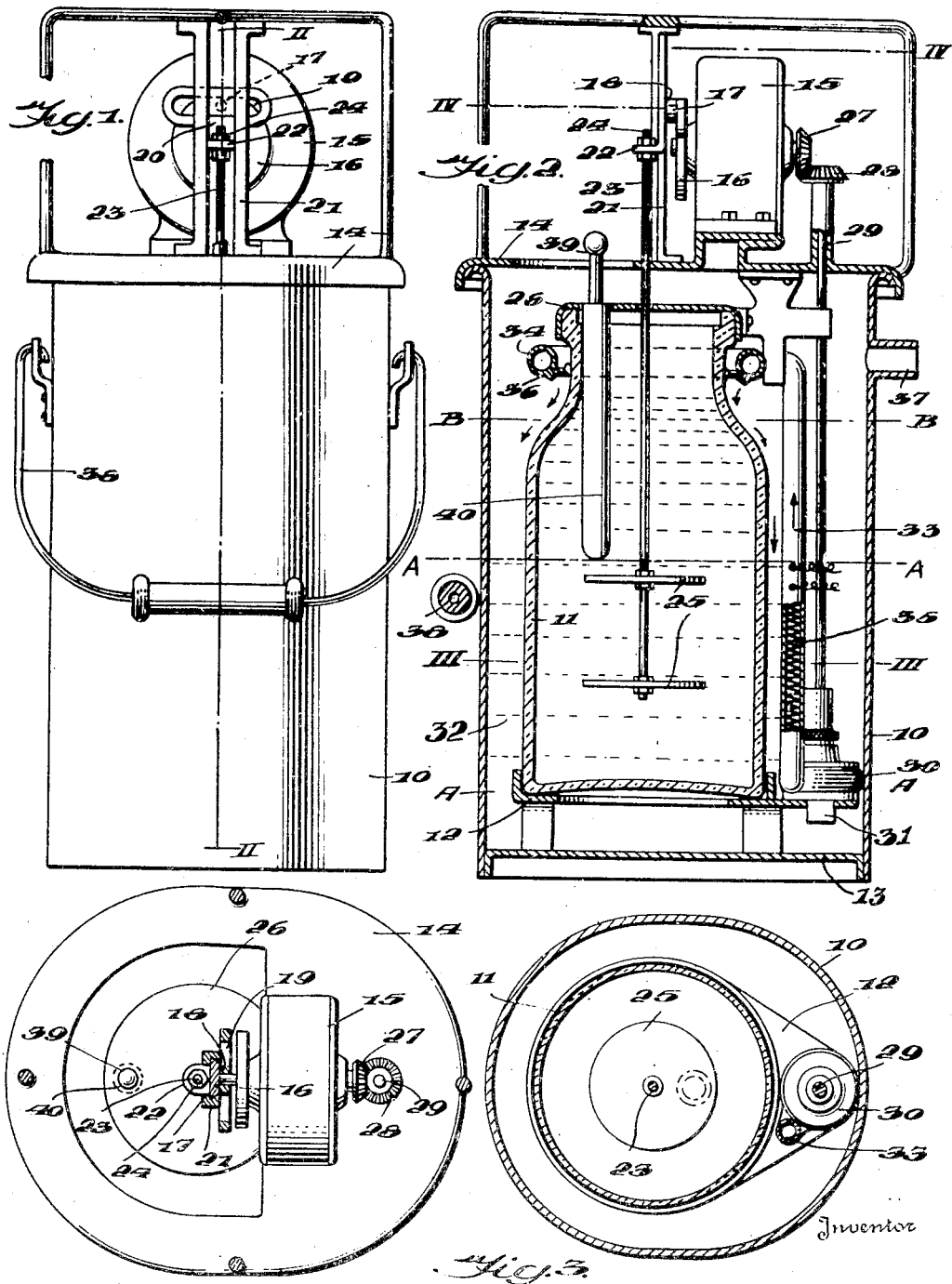
Inventor
Eli F. Mangold.
By
Attorney

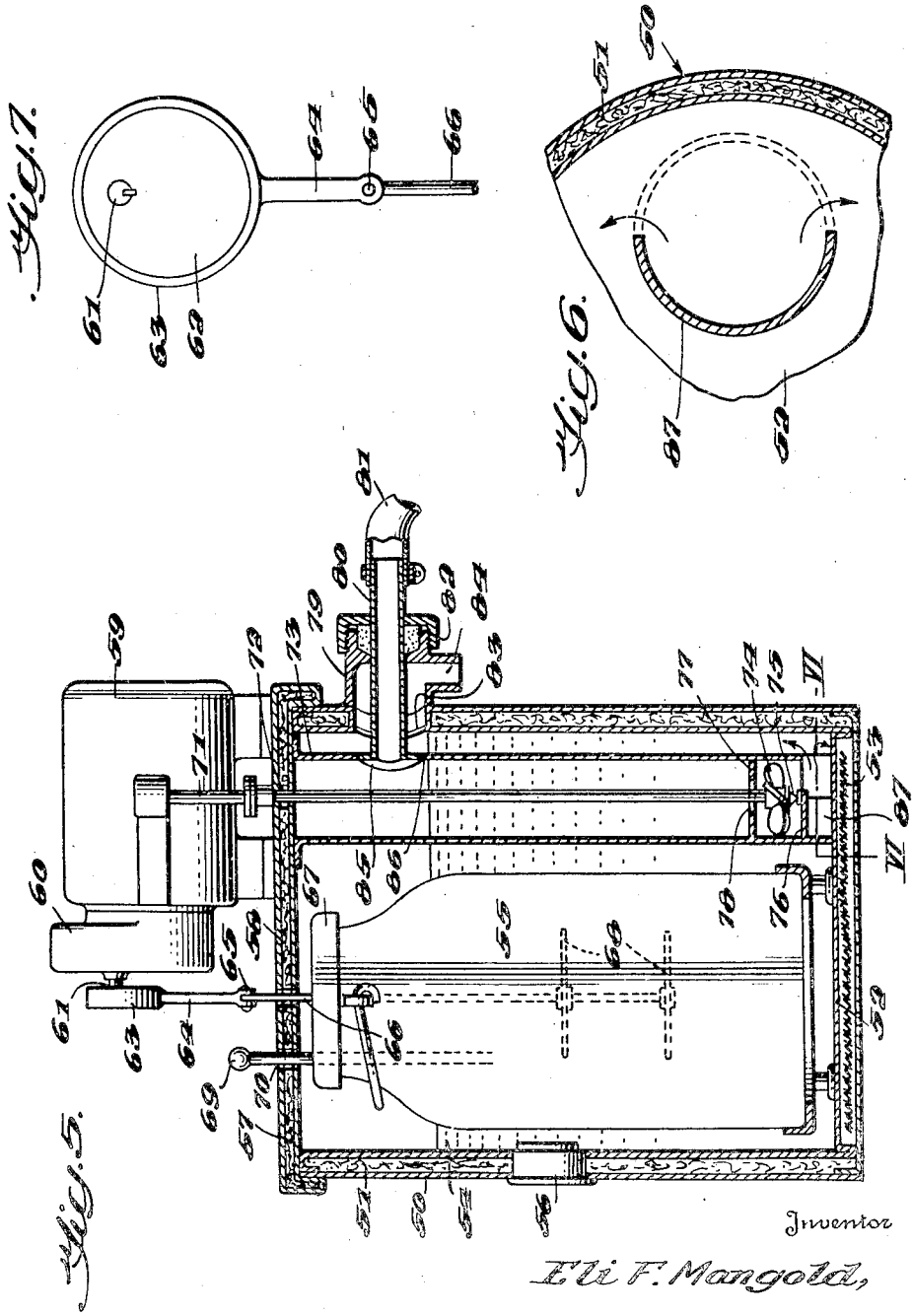

Patented Feb. 24, 1948

2,436,585

UNITED STATES PATENT OFFICE 2,436,585

PORTABLE MILK-PASTEURIZING APPARATUS

Eli F. Mangold, London, Ohio, assignor of one-half to Harold P. Chapman, Columbus, Ohio Application September 1, 1943, Serial No. 500,753

8 Claims. (Cl. 99—252)

This invention relates to improvements in apparatus for effecting controlled variations in the temperature of liquids and, in its more specific aspects is directed to an improved apparatus for effecting the pasteurizing of animal-obtained milk or cream.

While milk pasteurization for bacteria-controlling purposes is a matter of common practice in the dairy industry, the apparatus now employed for the purpose is of relatively large capacity and utilized mainly by commercial companies handling dairy products. There exists, therefore, a demand for a relatively small capacity milk pasteurizer which may be used domestically by farmers, householders and others who do not have ready access to present pasteurizing equipment or who cannot obtain readily milk treated by such equipment.

Accordingly, it is an object of the present invention to provide simple, readily controlled and efficient equipment of a portable and low-cost character adapted for practical usage in the effective pasteurization of milk or cream and for employment in homes or on small dairy farms, the apparatus having the capacity, for example, of pasteurizing milk in quantities varying between one to ten gallons.

It is another object of the invention to provide a portable, low-capacity milk pasteurizer composed of an outer casing adapted for the reception of an inner, removable, milk-holding receptacle, the outer casing being adapted to contain in surrounding contact with the walls of the inner receptacle a temperature-varying liquid, whereby when the liquid is either heated or cooled, the temperature of the milk within the inner receptacle may be varied at will.

It is another object of the invention to provide portable pasteurizing apparatus of the character set forth wherein the outer casing unit has mounted in a removable manner on the open top thereof a frame structure used in effecting the support of an electric motor, said frame structure further carrying a movable agitator which is adapted to be inserted into the milk contained within the inner receptacle, there being motion-transmitting means mounted on the frame structure for transmitting power from the motor to the agitator, in order that the latter may be kept in motion while the milk is undergoing pasteurizing treatment.

A further object of the invention resides in providing portable pasteurizing equipment of the character indicated and wherein the temperature-regulating liquid disposed in the outer container or casing is circulated by means of a pump, the latter being driven by the motor carried by the removable frame structure of the equipment, the outlet of the pump extending to a spray coil which is positioned to surround the upper end of the milk-receiving receptacle, so that in the operation of the apparatus, the heated liquid may be forced through orifices provided in the spray coil and caused to flow gravitationally over the outer surfaces of the milk-receiving receptacle, thereby heating the contents of said receptacle to a required degree of temperature.

Other objects reside in the provision of apparatus of the character indicated which is simple to use and operate, capable of being readily maintained in a cleanly and sanitary condition, composed of few and simple parts which are not likely to become out of order or to occasion undue repairs or adjustments and in apparatus of sturdy and low-cost construction.

For a further understanding of the invention, reference is to be had to the following description and the accompanying drawing, wherein:

Fig. 1 is a view mainly in front elevation of the improved milk pasteurizing apparatus comprising the present invention, a portion of the frame structure being broken away to disclose the mechanism for imparting reciprocating movement to the agitator;

Fig. 2 is a vertical sectional view taken through the apparatus on the plane indicated by the line II—II of Fig. 1;

Fig. 3 is a horizontal sectional view on the plane disclosed by the line III—III of Fig. 2;

Fig. 4 is a similar view on the plane indicated by the line IV—IV of Fig. 2;

Fig. 5 is a vertical sectional view taken through a modified form of my apparatus;

Fig. 6 is a detail sectional view on the line VI—VI of Fig. 5;

Fig. 7 is a detail front view of the drive mechanism.

Referring more particularly to the drawings and to the specific embodiment thereof illustrated in Figs. 1 to 4, inclusive, the numeral 10 designates the outer container and the numeral 11, the inner milk-receiving receptacle. Preferably, the outer container is of sheet metal construction, while the inner receptacle is formed from glass, although any other suitable materials may be used.

Removably positioned on the bottom of the receptacle is a stand 12, which receives the base of the receptacle 11 and maintains the latter in spaced relation from the bottom 13 of the container 10. Removably mounted on the top of the outer container is a frame 14, which may be removed from the container at will. The frame carries an electric motor 15, the armature shaft of which through speed reduction gearing, not shown, rotates a disk 16. This disk carries an eccentrically disposed stud 17, the latter being rotatably received within an opening provided in a sliding block 18, the latter, in turn, being slidably received within an elongated slot 19 formed in the upper end of a vertically slidable cross head 20.

Fixed guides 21 are carried by the frame 14 and disposed at the opposite sides of the cross head 20 for regulating its sliding movement. Projecting forwardly from the cross head is a lug 22 in which is received the upper end of an agitator rod 23, the threaded upper end of said rod carrying nuts 24 to secure the rod adjustably in connection with the cross head.

The rod 23 extends axially into the interior of the receptacle 11 and is provided contiguous to its lower end with a plurality of agitating disks 25. It will be seen that when the motor is energized, relatively slow reciprocating movement is imparted to the cross head 20, corresponding movement being imparted to the agitator in order to keep in a state of desired motion the milk contained within the receptacle 11, so that during the heating of the receptacle, sufficient motion will be imparted to the milk to prevent the portions thereof which contact directly with the walls of the receptacle from becoming overheated, since such overheating has a known tendency to impart an undesired flavor or taste to the milk. The under part of the frame 14 carries a lid 26, which is used to cover the open mouth of the receptacle 11 when the apparatus is positioned for active operation.

The end of the armature shaft of the motor 15 opposite to that which drives the disk 16, is provided with a beveled gear 27 which meshes with the corresponding gear 28 fixed upon the upper end of a pump shaft 29. The latter extends downwardly to a frame-carried centrifugal pump 30, which rests on the stand 12 and has its inlet 31 submerged in a body of l'quid 32 disposed in the bottom of the container 10. By this arrangement, the motor drives both the agitator and the centrifugal pump, the pump being rotated at a relatively high rate of speed and the agitator relatively slowly reciprocated.

The outlet of the pump communicates with a vertically extending pipe 33 which leads to a frame-carried spray coil 34 surrounding the neck of the receptacle 11. If desired, the pipe 33 may be provided with an electrically energized resistor type heater 35, by means of which water, or other liquid, forced from the bottom of the container by the action of the pump and advanced upwardly through the pipe 33 is heated to a desired temperature before being discharged through the downwardly directed orifices 36 of the coil 34. These orifices are arranged in closely spaced relationship so that a film of the heated liquid flows over the outer walls of the receptacle to raise the temperature of the contents of the latter. If the resistor 35 is not used as the heating element, the container may be placed over a gas burner or other source of heat, and the liquid within the container thereby heated by an extraneous means.

Also, in a simplified form of my invention, the pump 30 may be omitted and the level of the water within the outer container raised until it surrounds the curved neck portion of the receptacle 11. Then by placing the container over the burner, the desired heating of the liquid may be obtained. I have found it desirable in all forms of my invention to use the movable agitator, for reasons above set forth. Near its top, the outer container is provided with an overflow outlet 37, which is particularly useful during the cooling stage for the pasteurized milk. The outer container may also be provided with a pivoted handle 38 to facilitate carrying or lifting of the same.

In the use of my improved pasteurizer, milk or cream of suitable butter fat content is placed in the glass jar comprising the inner receptacle, the latter being filled to a desired level with the milk to be pasteurized. The receptacle is then placed on the stand 12 disposed in the bottom of the container 10, and if the pump 30 is used, the bottom of the container is filled with water to the level indicated at A in Fig. 2. In the event the pump is not employed, the level of the water is elevated to approximately the plane B of Fig. 2.

The motor-carrying frame is then positioned on the top of the container, with the agitator mechanism extending into the receptacle 11. The container may then be positioned over a stove burner, hot plate, or other source of heat, or the pump and resistor mechanism may be used to heat the water in the container. This heating of the water takes place until the milk within the receptacle is brought to a temperature of approximately 145° F. This temperature may be ascertained by the use of a dairy thermometer 39 which is removably positioned within a well 40 extending from the receptacle top or lid thereof. When the pump mechanism is used, a small amount of the heating water is employed in the outer container and improved control is obtainable over the heating operation, and I prefer to use the pump mechanism unless manufacturing economies necessitate a high order of structural simplification. However, when the pump mechanism is omitted, by increasing the quantity of water in the outer container and closely observing the thermometer 39, desired temperature control can be obtained.

When the milk within the inner receptacle has reached the temperature of 145° F., the heating operation is discontinued, as by turning off the burner beneath the outer container or by deenergizing the resistor 35, and the temperature of pasteurization is retained during the so-called "hold-over" period for about thirty minutes. Thereafter, flowing cold water is introduced into the container from any suitable source, overflow of such cold water taking place through the outlet 37. During the heating, hold-over and cooling operations, the agitator is kept in motion. When the milk within the inner receptacle reaches a temperature of approximately 80° F., the flow of cold water is stopped, and a refrigerant, such as crushed ice, is introduced into the container and packed around the receptacle. By this means, the temperature of the milk may be reduced to approximately 50° F., at which stage the complete pasteurizing operation is finished and the milk is ready for storage or use.

In the apparatus disclosed in Figs. 5, 6 and 7, a container 50 is employed composed of spaced double walls between which heat insulating material 51 may be positioned. The bottom wall 52 of the container has incorporated therein an electrically energized heating resistance 53, by means of which heat may be imparted to the water or other liquid 54 received within the container and which surrounds the inner milk-receiving jar or receptacle 55. A temperature indicator 56 may be inserted in the side wall of the container 50 to disclose externally the temperature of the water 54. The open top of the container is provided with a removable lid or cover 57 which, advantageously, may be of a double wall type, adapted for the reception of insulating material 58.

Mounted on the top of the cover 57 is an electrically energized motor 59, the frame of the latter having connected therewith a casing 60 in which speed-reducing gearing of any conventional type is incorporated. This gearing drives a shaft 61 having secured to the outer end thereof an eccentric 62. Surrounding the eccentric is a strap 63 carrying a depending stem 64, the latter having its lower end pivoted as at 65 to the upper end of an agitator shaft 66. The shaft slidably projects through an opening in the cover 57 and through the lid 67, closing the top of the receptacle 55, into the interior of said receptacle, the bottom of the agitator carrying disks 68 or their equivalent so that milk or other liquids placed within the receptacle may be agitated while the same is undergoing temperature variations. A thermometer 69 is used to indicate the temperature of the liquids within the receptacle, the thermometer being removable through an opening 70 provided in the cover or closure 57.

The armature shaft of the motor 59 drives a vertically extending impeller shaft 71 at a comparatively high rate of speed. This shaft extends through an opening 72 provided in the cover 57 and passes axially through a vertically disposed tube 73 which has its upper end connected with the under side of the cover 57 and its lower end either resting on or disposed immediately adjacent to the bottom 52 of the container. The bottom of the shaft 71 carries an impeller 74 and the extreme lower end of the shaft has a point bearing as at 75 with a semi-circular wall 76 projecting horizontally from the bottom of the tube 73. Just above the impeller, the tube is formed with an inwardly projecting wall 77 having a central opening 78 through which the impeller shaft passes.

The outer wall of the container 50, contiguous to the tube 73, is formed with a lateral extension 79 in which is slidably positioned a water inlet pipe 80. This pipe may be connected by a hose 81 with a source of hot or cold water supply. The pipe is slidably carried by a packed bearing 82 formed at the outer end of the extension 79. The extension is also formed so as to provide at the inner end thereof a seat 83 and an overflow passage 84, while the inner end of the pipe 80 is formed with a valve disk 85 which, through manipulation of the pipe, may engage selectively with the seat 83 of the container extension 79 or with the walls of an opening 86 formed in the tube 73.

With the apparatus positioned as disclosed in Fig. 5, operation thereof may be initiated by advancing, preferably, hot water through the pipe 80 so that it may pass downwardly through the tube 73 and by the action of the motor-driven impeller forced outwardly through the open bottom of the tube in the direction indicated by the arrows in Figs. 5 and 6. This direction is obtained by forming the bottom of the tube 73 to constitute an arcuate baffle 87. When the water reaches a level within the container in which it passes out through the overflow passage 84, the pipe 80 may be shifted so that the valve disk 85 may be engaged with the seat 83 and then by the action of the heater 53, the temperature of the water may be raised the required degree to heat the liquid contained within the receptacle 55. The temperature of the water undergoing heating may be observed by the indicator 56, and the temperature of the contents of the receptacle 55 by the thermometer 69.

In pasteurizing animal milk, the same procedure is followed as in the previously described form of my apparatus. Following the temperature raising and hold-over stages, the pipe 80 is positioned so that its disk 85 is positioned in the opening 86. Cold water may then be allowed to flow through the pipe 80 into the container, until the temperature of the contents of the receptacle 55 is reduced as far as possible with the aid of cold water. The flow of cold water may be stopped and the disk moved into engagement with the seat 83, so that the overflow passage is blocked, after which a refrigerant, such as ice, may be added to the liquid within the container to further reduce the temperature of the contents of the receptacle to the order of approximately 50° F., completing the treatment.

While I have described my apparatus as being particularly useful in subjecting animal milk to pasteurizing treatment, it will be understood that there are other uses to which the apparatus may be placed, as in chemical or control laboratories where it is desired to effect ascertainable variations in the temperature of liquids or other flowable materials. While it is preferable to drive the agitator and pump impeller by means of an electric motor, since electrical power is now so widely available, even in rural districts, nevertheless, in the event this power is not available, spring motors may be substituted for the electric motors or use may be made of steam actuated motors or, in certain cases, strictly manually operated means. Also, while I have described my apparatus as being particularly useful in the pasteurization of animal milk in relatively small volumes for household consumption, it will be understood that the same may be adapted to units of any desired size, i. e., liquid holding and treating capacity.

From the foregoing, it will be seen that the present invention provides simple, efficient and relatively inexpensive apparatus for effecting the pasteurization of animal milk in relatively small volumes for household consumption. It is for this field of use that the apparatus forming the present invention has been especially developed, although, of course, its principles of construction and operation are applicable to pasteurization units of any desired size.

Although I have shown and described the invention as consisting of certain detail structural elements, nevertheless, it will be understood that certain changes may be made therein without departing from the spirit and scope of the following claims.

I claim:

1. Portable milk-pasteurizing apparatus comprising an outer container, an inner milk-receiving receptacle, means for positioning said receptacle within said container with the walls of the receptacle spaced from those of the container to provide a liquid-receiving space therebetween, a frame removably mounted on the top of said container, a motor carried by said frame, a pump having its inlet adapted to be submerged in the liquid disposed within said container, means driven by said motor for operating said pump, a spray coil surrounding the upper portion of said receptacle, said coil being in communication with the outlet of said pump, an agitator carried by said frame and adapted to be positioned within said receptacle, and means driven by said motor for operating said agitator.

2. Portable milk-pasteurizing apparatus comprising an outer container, an inner milk-receiving receptacle, means for positioning said receptacle within said container with the walls of the receptacle spaced from those of the container to provide a liquid-receiving space therebetween, a frame removably mounted on the top of said container, a motor carried by said frame, a pump having its inlet adapted to be submerged in the liquid disposed within said container, means driven by said motor for operating said pump, a spray coil surrounding the upper portion of said receptacle, said coil being in communication with the outlet of said pump, and means for heating the liquid while it is undergoing transference between said pump and said spray coil.

3. In portable milk-pasteurizing apparatus, an outer container, an inner milk-receiving receptacle, means for positioning said receptacle within said container with the side and bottom walls of the receptacle disposed in spaced relation from those of the container, whereby to provide a liquid-receiving space therebetween, a frame removably disposed on the top of said container, a motor carried by said frame, an agitator positionable in said receptacle, a cross head carried by said frame for vertical sliding movement, means driven by said motor for operating said cross head, and means uniting said cross head with said agitator.

4. A unitary self-contained portable milk-pasteurizing machine, comprising an open-topped container formed for the reception of a removable milk-holding receptacle, said container receiving a body of a heat-carrying liquid for circulation over the external walls of the receptacle, a cover member removably mounted on the top of said container, a motor positioned on said member, an agitator for the contents of said receptacle driven by said motor, said agitator being movable unitarily with said cover member, impeller means driven by said motor and movable unitarily with said cover member for imparting forced circulatory movement to said heat-carrying liquid, and means connected unitarily with said cover member for imparting heat to said liquid.

5. A unitary self-contained portable milk-pasteurizing machine, comprising an open-topped container formed for the removable reception of a milk-holding receptacle, said container receiving a body of a heat-carrying liquid for circulation around the exterior walls of the receptacle, a cover-forming frame member removably positioned on the top of said container, a motor secured to said member, a movable agitator supported in connection with said motor and cover member and normally extending into said receptacle, a liquid-displacing impeller depending from said cover member into the body of liquid contained in said container, means driven by said motor for operating said impeller to impart forced circulatory movement to said heat-carrying liquid, and means supported in connection with said cover member for heating said liquid to pasteurizing temperatures.

6. A portable self-contained milk-pasteurizing machine, comprising an open-topped container formed for the removable reception of a milk-holding receptacle, said container being adapted to receive a body of a heat-carrying liquid, a supporting member removably mounted on the top of said container, a motor positioned on said member, a movable agitator carried in connection with said motor and member and adapted to extend into the interior of said receptacle, impeller means driven by said motor and supported by said member in the body of liquid disposed within said container for imparting forced circulatory movement to the liquid, a liquid outlet conduit for said impeller means, and an electrically energized heating element disposed in said conduit.

7. A portable self-contained milk-pasteurizing machine, comprising an outer container formed for the reception of a removable internally positioned milk-holding receptacle, said container receiving a body of a heat-carrying liquid for circulation around the exterior walls of said receptacle, an operating motor supported by said container, a movable agitator driven by said motor and extending into said receptacle, fluid-displacing impeller means driven by said motor for imparting forced circulatory movement to the heat-carrying liquid, and means forming a unitary part of the machine for imparting heat to said liquid during circulation thereof.

8. A portable milk-pasteurizing machine, comprising an open-top container formed for the removable reception of a milk-holding receptacle, said container being adapted to receive a body of a heat-carrying liquid, a closure member mounted removably on the top of said container, a motor positioned on said member, a movable agitator driven by said motor and positioned in said receptacle for imparting movement to milk contained therein, impeller means driven by said motor and supported by said closure member in the body of liquid disposed within said container and exteriorly of said receptacle for imparting forced circulatory movement to the liquid, and electrically energized heating means for heating the circulating liquid while the milk in said receptacle is undergoing agitation in said receptacle.

ELI F. MANGOLD.

REFERENCES CITED

The following references are of record in the file of this patent:

UNITED STATES PATENTS

| Number | Name | Date |
| --- | --- | --- |
| 1,199,974 | Feldmeier | Oct. 3, 1916 |
| 1,438,594 | Goldberger | Dec. 12, 1922 |
| 1,701,777 | Jensen | Feb. 12, 1929 |
| 1,732,010 | Goodell | Oct. 15, 1929 |
| 1,740,729 | Garvis | Dec. 24, 1929 |
| 1,823,637 | Wright | Sept. 15, 1931 |
| 1,984,956 | Anglim | Dec. 18, 1934 |
| 2,323,308 | Chamberlain | July 6, 1943 |